Patented Jan. 27, 1948

2,435,148

UNITED STATES PATENT OFFICE 2,435,148

CHLORINATED DIMETHYL SILICONE POLYMERS

Rob Roy McGregor, Verona, and Earl Leathen Warrick, Pittsburgh, Pa., assignors to Corning Glass Works, Corning, N. Y., a corporation of New York No Drawing. Application May 25, 1945, Serial No. 595,876

6 Claims. (Cl. 260—607)

This invention relates to new compositions of matter and methods of preparing them.

The present application is a continuation-in-part of our copending application Serial Number 432,530, filed February 26, 1942, now Patent No. 2,384,384, issued September 4, 1945, and assigned to the assignee of the present invention.

The primary object of the present invention is to prepare chlorinated dimethyl silicone polymers. Other objects and advantages will be apparent from the following description and claims.

In accordance with our invention, we have discovered that polymeric dimethyl silicone may be chlorinated to yield products which are useful either as intermediates in the preparation of other materials or which are useful in their own right as coating compositions (as will be later described). The chlorination of the dimethyl silicone polymers is preferably carried out by passing chlorine through the polymers in a liquid state at a temperature within the range of about 30° C. to 200° C. and preferably in the presence of sunlight. As a result of such treatment the viscosity of the silicone increases and if continued for a sufficient time a waxy solid is produced. As high as 65% by weight of chlorine can be introduced into the silicone in this manner. If the chlorination is stopped at some intermediate point, a viscous liquid is obtained which, upon being heated, increases rapidly in viscosity until ultimately a gel is produced rather than a waxy solid. The melting point of the waxy solid produced by extended chlorination depends upon the amount of chlorine introduced, the larger the amount the higher the melting point. To obtain the highly chlorinated products, it is advisable to employ an inert solvent such as carbon tetrachloride. We have found that it is immaterial whether the starting silicone is a cyclic polymer, such as the tetramer or pentamer, or whether it is a chain polymer whose terminal groups are hydroxyl, chlorine, or trimethyl silicon units, or combinations thereof.

The chlorinated products of our invention whether in a low or high degree of chlorination are useful as intermediates in the preparation of other compositions. For example, the chlorinated cyclics having from one to two chlorine atoms per cyclic unit are useful in the preparation of thermally stable liquids of low pour points as will be described in the examples. However, we have found the products to be particularly useful in their own right as coating materials for glass threads. The latter are composed of a large number of fine attenuated glass fibers, some of which break during sewing operations causing fuzzing of the thread and seriously hindering the rapid and effective fabrication of textile fabrics and the like. When the thread is coated with a chlorinated dimethyl silicone and baked to a tack-free state, not only is the fuzzing problem completely solved, but also the tensile strength of the thread is considerably increased. The products of the present invention are also useful as additives to lubricants such as petroleum oils to improve their resistance to extreme pressure.

For a better understanding of our invention reference should be had to the following examples which are given by way of illustration and not limitation.

Example 1

The cyclic pentamer of dimethyl silicone was chlorinated by passing chlorine gas through it at room temperature in the sunlight until analysis showed that it contained about .1 chlorine atom per carbon atom or one chlorine atom per cyclic unit. When the chlorinated product was distilled only about 20% of it boiled in the neighborhood of the boiling point of the pentamer. The remaining 80% was not only higher boiling but was also much more viscous. Continued heating of the latter portion resulted in gelation.

Example 2

The cyclic pentamer of dimethyl silicone was chlorinated by passing chlorine gas through it at room temperature and in the sunlight until analysis showed that it contained about 1.09 chlorine atoms per carbon atom or about 10 chlorine atoms per cyclic unit. The product was a clear waxy solid with a melting point of about 150° C. When heated in an open beaker without a catalyst for about 15 hours at about 125° C. HCl was evolved and the material lost its waxy characteristics and became a resinous solid. When treated with aluminum chloride and heated at 175° C. it became a tacky resinous solid in four hours. The effect of chlorine content on melting point was demonstrated in the following manner. When 0.8 atom per carbon atom was introduced into the cyclic pentamer the product had a melting point of 98° C. When the chlorine content was 1.04 chlorines per carbon atom, the melting point was 165° C. and when it was 1.20, the melting point was 185° C.

Example 3

As in Example 2, the cyclic tetramer of dimethyl silicone was chlorinated at room temperature until analysis showed it to contain about .37 chlorine atom per carbon atom or about 3 chlorine atoms per cyclic unit. When the chlorinated material was heated to 250° C., it formed a semi-solid mass. From this product an oily liquid was extracted with benzene which, on heating overnight at 230° C. became solid.

*Example 4*

34% by weight of slightly chlorinated cyclic tetrameric dimethyl silicone (about .12 chlorine atom per carbon atom or about 1 chlorine atom per cyclic unit) was added to a mixture of chain polymers of dimethyl silicone having a viscosity of 112 centistokes. These chain polymers, as well as those employed in the following examples, contained terminal hydroxyl groups and were prepared as described in our copending application Serial Number 432,530, mentioned above. The resulting mixture was heated for two hours at 220° C. The viscosity increased to only 140 centistokes but the pour point was about 10 degrees lower than that of the original mixture of chain polymers despite the fact that the pour point of the cyclic tetramer per se is above that of the chain polymers.

*Example 5*

Equimolecular proportions of the chlorinated cyclic tetramer employed in Example 4 and chain polymers of dimethyl silicone were mixed and heated for three hours at 175° C. and for six hours at 200° C. Whereas the original chain polymers congealed in 10 minutes when held at —76° C. the reaction product required 105 minutes to congeal at this temperature.

*Example 6*

73.3% by volume of chain polymers of dimethyl silicone obtained by distilling off the cyclic polymers and having an average molecular weight of about 2000, a viscosity of about 490 centistokes and a pour point of —60° C. was mixed with 26.7% by volume of the cyclic tetramer of dimethyl silicone which had been chlorinated until it contained .25 chlorine atom per carbon atom. The mixture was refluxed for 6 hours at 175° C. and then for 6 hours at 200° C. The product had a viscosity of 803 centistokes and a pour point of —70° C.

*Example 7*

The cyclic pentamer of dimethyl silicone was chlorinated by passing chlorine gas through it at room temperature until analysis showed that it contained about 2.5 chlorine atoms per carbon atom. When a mixture of the chain polymers of dimethyl silicone and 10% of the chlorinated pentamer was heated at 140° C. the initial viscosity of 333 centistokes increased from two hours heating to 1180 centistokes; after six hours heating to 2190 centistokes; and after nine hours heating the material had become a rubbery resin. The process was repeated using 2% of the chlorinated pentamer and again the polymeric dimethyl silicone was converted to a rubbery resin on heating at 140° C. When only 0.2% of the chlorinated pentamer was used, the viscosity of the polymeric dimethyl silicone rose from 113 to 130 centistokes after 22 hours heating at 150° C.

*Example 8*

A mixture of chain polymers of dimethyl silicone and 10% of chlorinated cyclic pentameric dimethyl silicone (about 2.5–3.0 chlorine atoms per carbon atom) on being heated for nine hours at 140° C. resulted in a stringy rubbery resin which was about 50% soluble in benzene. The benzene solution was used to impregnate a glass tape which was then cured to a tack-free condition by being heated for 24 hours at 230° C. and was not further changed by 48 hours additional heating. The impregnated tape after curing felt rubbery and snapped back into position when sharply bent. It also showed remarkable elasticity and ability to completely recover when stretched in a direction diagonal to the weave, the stretch with and across the weave being restricted by the glass fibers themselves.

*Example 9*

A mixture of chain polymers of dimethyl silicone was chlorinated until its chlorine content was about 6% by weight and its viscosity about 75,000 centistokes. The product was heated at 230° C. with 3.7% by weight of boric oxide until a rubbery solid was obtained. The latter possessed considerable elasticity without the property of "cold flow" which is common to most dimethyl silicone polymers treated in like manner with boric oxide.

*Example 10*

Liquid dimethyl silicone prepared by the hydrolysis of dimethyldiethoxy silane in the presence of sulfuric acid and having a viscosity of 500 centistokes was chlorinated by passing chlorine gas through it at room temperature in sunlight until analysis showed it to have 5.7% by weight of chlorine. The chlorinated product was heated at 145° C. Its viscosity slowly increased until finally it became a homogeneous gel which was soluble in benzene. Glass fiber tapes were impregnated with the benzene solution of the gel and the solvent volatilized. The impregnated tape was then heated at 250° C. until the coating became tack-free and hard. Further heating at the same temperature for many hours left the tape essentially unchanged.

*Example 11*

Liquid dimethyl silicone having a viscosity of 500 centistokes was chlorinated in the manner of Example 10 to 9.4% chlorine content. The product was dissolved in $CCl_4$ to make a 5% solution. Glass thread was dipped into the solution and then baked to dryness. It was found that the strength of the thread had increased; its grist and stiffness had changed only slightly. On being subjected to sewing operations there were no breaks or fuzzing whereas the untreated thread when subjected to the same test broke twice and was very fuzzy through the entire operation.

We claim:

1. The method which comprises passing chlorine through a cyclic dimethyl silicone polymer until it is slightly chlorinated, mixing the resulting product with chain polymers of dimethyl silicone having terminal hydroxyl groups and heating the mixture to cause a reaction.

2. The method which comprises chlorinating a cyclic dimethyl silicone polymer until it contains from approximately 1 to approximately 2 chlorine atoms per cyclic unit, mixing the resulting product with chain polymers of dimethyl silicone having terminal hydroxyl groups, and heating the mixture to cause a reaction.

3. The method which comprises chlorinating cyclic tetrameric dimethyl silicone polymer until it contains from approximately 1 to approximately 2 chlorine atoms per cyclic unit, mixing the resulting product with chain polymers of dimethyl silicone having terminal hydroxyl groups, and heating the mixture to cause a reaction.

4. The method which comprises reacting a chlorinated cyclic dimethyl silicone polymer with chain polymers of dimethyl silicone having terminal hydroxyl groups.

5. The method which comprises reacting chlorinated tetrameric cyclic dimethyl silicone polymer with chain polymers of dimethyl silicone having terminal hydroxyl groups.

6. The method which comprises reacting chlorinated pentameric cyclic dimethyl silicone polymer with chain polymers of dimethyl silicone having terminal hydroxyl groups.

ROB ROY McGREGOR.
EARL LEATHEN WARRICK.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,258,219 | Rochow | Oct. 7, 1941 |
| 2,258,222 | Rochow | Oct. 7, 1941 |
| 2,298,295 | Hyatt | Oct. 13, 1942 |
| 2,347,733 | Christensen | May 2, 1944 |
| 2,371,050 | Hyde | Mar. 6, 1945 |
| 2,384,384 | McGregor | Sept. 4, 1945 |

OTHER REFERENCES

Taylor, "Journal American Chemical Society," vol. 66, pages 842–843 (1944).

Ushakov, "Chemical Abstracts," vol. 32, page 2083 (1938).

Beilstein, "Handbuch der Org. Chem.," 4th ed., vol. IV, pages 625 and 629.